United States Patent [19]  [11]  4,176,222
Cinderey et al.  [45]  Nov. 27, 1979

[54] PRODUCTION OF AROMATIC POLYETHERS

[75] Inventors: Michael B. Cinderey, Stevenage; John B. Rose, Letchworth, both of England

[73] Assignee: Imperial Chemical Industries Limited, Great Britain

[21] Appl. No.: 873,478

[22] Filed: Jan. 30, 1978

[30] Foreign Application Priority Data

Feb. 1, 1977 [GB] United Kingdom ............... 4009/77

[51] Int. Cl.$^2$ ............................................. C08G 65/40
[52] U.S. Cl. ................... 528/126; 528/125; 528/128; 528/174; 528/219
[58] Field of Search ............... 528/125, 126, 219, 174

[56] References Cited

U.S. PATENT DOCUMENTS 3,332,909  7/1967  Farnham et al. ............... 528/219
3,941,748  3/1976  King ........................... 528/125

Primary Examiner—Lester L. Lee
Attorney, Agent, or Firm—Cushman, Darby & Cushman

[57] ABSTRACT

Aromatic polyethers containing —SO$_2$— and/or —CO— groups are made by reacting (i) an equimolar mixture of a bisphenol and an aromatic dihalo compound or (ii) a halophenol, in which dihalo compound or halophenol the halogen atoms are activated by ortho or para —SO$_2$— or —CO— groups, with sodium carbonate or bicarbonate in admixture with a second alkali metal carbonate or bicarbonate the alkali metal of the second carbonate or bicarbonate being of higher atomic number than that of sodium. The amount of the second alkali metal carbonate or bicarbonate is such that there is 0.001 to 0.2 gram atom of the second alkali metal per gram atom of sodium.

13 Claims, No Drawings

PRODUCTION OF AROMATIC POLYETHERS

This invention relates to the production of aromatic polyethers and in particular to the production of aromatic polyethers containing sulphone and/or ketone linkages (termed hereinafter aromatic polyethersulphones and polyetherketones according to whether the sulphone or ketone linkages preponderate).

It has been proposed in Canadian Pat. No. 847,963 to make such polymers by reacting a bisphenol and a dihalobenzenoid compound, or a halophenol, in which dihalobenzenoid compound or halophenol the halogen atoms are activated by $-SO_2-$ or $-CO-$ groups ortho or para thereto, with an alkali metal carbonate or bicarbonate.

While the reaction proceeds quite rapidly when using potassium carbonate or bicarbonate, these reagents are costlier to use than sodium carbonate or bicarbonate since they are more expensive and are required in larger amounts by weight to produce an equivalent concentration of alkali metal on account of their higher molecular weight. Furthermore in the case of the production of certain polyetherketones made from the polycondensation of hydroquinone and a difluorobenzenoid compound in which the fluorine atoms are activated by $-CO-$ groups ortho or para thereto (described in more detal hereinafter), the sole use of potassium carbonate or bicarbonate may, except for small laboratory-scale reactions, result in the formation of a polymer of unacceptably high gel content, also we have discovered in such a polycondensation using potassium carbonate or bicarbonate that the reaction vessel if made of stainless steel tends to become discoloured with a black coating which must be removed before the next polymerisation in the vessel. The same problems may apply in respect of the use of alkali metal carbonates or bicarbonates in which the alkali metals are of greater atomic number than that of potassium.

While it is possible to use the less costly sodium carbonate or bicarbonate, the reaction with these reagents is, generally speaking, rather slow. Furthermore in the case of the production of the certain polyetherketones mentioned in the preceding paragraph, the use of sodium carbonate or bicarbonate results in the formation of a brittle polymer of low molecular weight and poor colour.

According to the present invention we provide a process for the production of an aromatic polymer comprising heating in the temperature range 100° to 400° C. (i) a substantially equimolar mixture of (a) at least one bisphenol and (b) at least one dihalobenzoid compound, or (ii) at least one halophenol, in which dihalobenzenoid compound or halophenol the halogen atoms are activated by $-SO_2-$ or $-CO-$ groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from alkali metal halide.

It has been found that, surprisingly, if sodium carbonate or bicarbonate is used in conjunction with a very small quantity of a second alkali metal carbonate or bicarbonate as defined above, then a disproportionately faster reaction takes place. The process of the present invention therefore allows the production of polyethersulphones and polyetherketones both rapidly and at lower cost.

Preferred bisphenols include hydroquinone and those of formula

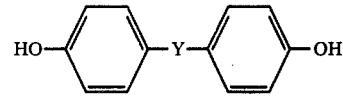

in which Y is a direct link, oxygen, sulphur, $-SO_2-$, $-CO-$, or a divalent hydrocarbon radical.

Particularly preferred bisphenols include
4,4'-dihydroxybenzophenone
4,4'-dihydroxydiphenylsulphone
2,2'-bis-(4-hydroxyphenyl)propane
4,4'-dihydroxybiphenyl
4,4'-dihydroxydiphenyl sulphide.

The dihalobenzenoid compounds preferably have the formula

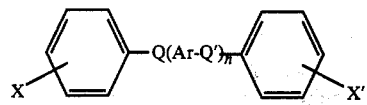

in which X and X', which may be the same or different, are halogen atoms and are ortho or para to the groups Q and Q', Q and Q', which may be the same or different, are $-CO-$ or $-SO_2-$, Ar is a divalent aromatic radical; and n is 0, 1, 2 or 3.

The aromatic radical Ar is preferably a divalent aromatic radical selected from phenylene, biphenylylene or terphenylylene.

Particularly preferred dihalides have the formula

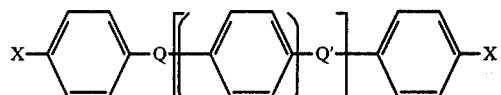

where m is 1, 2 or 3.

Examples of suitable dihalides include
4,4'-dichlorodiphenylsulphone
4,4'-difluorodiphenylsulphone
4,4'-difluorobenzophenone
4,4'-dichlorobenzophenone
4-chloro-4'-fluorodiphenylsulphone
4-chloro-4'-fluorobenzophenone
bis-4,4'-(4-chlorophenylsulphonyl)biphenyl.

Mixtures of dihalides may be employed so as to produce copolymers. Examples of mixtures that may be employed include 4,4'-dichlorodiphenylsulphone with 4,4'-dichlorobenzophenone or bis-4'-(4-chlorophenylsulphonyl)biphenyl.

Preferred halophenols are those of formula

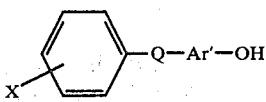

wherein X is halogen and is ortho or para to Q, Q is —SO$_2$— or —CO—, and Ar' is an aromatic radical, and —OH is preferably para to the group Q.

The aromatic radical Ar' is preferably a divalent aromatic radical selected from phenylene, biphenylylene, and radicals of the formula

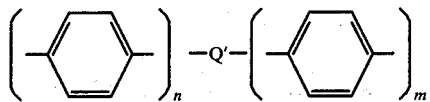

where Q' is —CO— or —SO$_2$— and n and m, which may be the same or different are integers selected from 1, 2 and 3. Particularly preferred halophenois have the formula

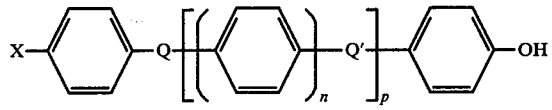

where p is 0 or 1.

Examples of suitable halophenols include
4-(4-chlorophenylsulphonyl)phenol
4-(4-fluorophenylsulphonyl)phenol
4-(4-chlorobenzoyl)phenol
4-hydroxy-4'-(4-chlorophenylsulphonyl)biphenyl
4-(4-hydroxyphenylsulphonyl)-4'-(4-chlorophenyl sulphonyl)biphenyl.

Mixtures of halophenols may be employed so as to produce copolymers. Examples of mixtures that may be employed include 4-(4-chlorophenylsulphonyl)phenyl with 4-(4-chlorobenzoyl)phenol, 4-hydroxy-4'-(4-chlorophenyl-sulphonyl)biphenyl, or 4-(4-hydroxyphenylsulphonyl)-4'-(4-chlorophenylsulphonyl)biphenyl.

Equally mixtures of one or more halophenols with a substantially equimolar mixture of a dihalide and a bisphenol may be employed. As an example there may be mentioned 4-(4-chlorobenzoyl)phenol in admixture with 4,4'-dichlorodiphenylsulphone and 4,4'-dihydroxydiphenyl sulphone.

The reaction may be carried out in the presence of an inert solvent, or in the absence of a solvent.

Preferably a solvent is employed and is an aliphatic or aromatic sulphoxide or sulphone of formula

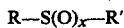

where x is 1 or 2 and R and R' are alkyl or aryl groups and may be the same or different. R and R' may together form a divalent radical. Preferred solvents include dimethyl sulphoxide, dimethyl sulphone, sulpholane (1,1 dioxothiolan), or aromatic sulphones of the formula

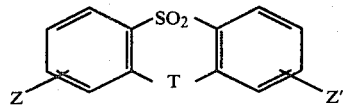

where T is a direct link, an oxygen atom or two hydrogen atoms (one attached to each benzene ring) and Z and Z', which may be the same or different, are hydrogen atoms or phenyl groups. Examples of such aromatic sulphones include diphenylsulphone, dibenzothiophen dioxide, phenoxathiin dioxide and 4-phenylsulphonyl biphenyl. Diphenylsulphone is the preferred solvent. Other solvents that may be used include N,N-dimethyl formamide and N-methyl-2-pyrrolidone.

The process of the invention is particularly advantageously applied to the production of a tough high molecular weight polyetherketone (referred to hereinbefore) made by the polycondensation of hydroquinone and a difluorobenzoid compound in which the fluorine atoms are activated by —CO— groups ortho or para thereto, the difluorobenzenoid compound in particular being 4,4'-difluorobenzophenone, in the presence of an aromatic sulphone solvent e.g. diphenylsulphone, wherein another unsuspected advantage is realised. It is found in this polycondensation reaction that the use of a mixture of sodium carbonate or bicarbonate with a minor amount of a carbonate or bicarbonate of a higher alkali metal according to the invention provides a polymer of little or no gel content (any scale) whereas a polymer made using potassium (or higher alkali metal) carbonate or bicarbonate alone may yield a polymer of unacceptably high gel content on a scale other than a small laboratory-scale, and provides a polymer of higher molecular weight, superior toughness and superior colour in comparison to a polymer made using carbonate or bicarbonate alone (any scale). In addition the use of a mixture of sodium carbonate or bicarbonate with a minor amount of a carbonate or bicarbonate according to the invention does not result in the formation of a dark surface coating when using a stainless steel reaction vessel as in the case when using potassium (or higher alkali metal) carbonate or bicarbonate alone.

In the process of the invention sodium carbonate or bicarbonate is used in admixture with a carbonate or bicarbonate of an alkali metal of higher atomic number. The higher alkali metal carbonates or bicarbonates are thus selected from sodium, potassium, rubidium and caesium carbonates and bicarbonates. Preferred combinations are sodium carbonate or bicarbonate with potassium carbonate or caesium carbonate.

The alkali metal carbonates or bicarbonates should by anhydrous although, if hydrated salts are employed, where the polymerisation temperature is relatively low, e.g. 100° to 250° C., the water should be removed, e.g. by heating under reduced pressure, prior to reaching the polymerisation temperature.

Where high polymerisation temperatures (>250° C.) are used, it is not necessary to dehydrate the carbonate or bicarbonate first as any water is driven off rapidly before it can adversely affect the course of the polymerisation reaction.

The total amount of alkali metal carbonate or bicarbonate employed should be such that there is at least 1 atom of alkali metal for each phenol group. Hence, when using a bisphenol there should be at least 1 mole of carbonate, or 2 moles of bicarbonate, per mole of bisphenol. Likewise where a halophenol is employed there should be at least 0.5 mole of carbonate, or 1 mole of bicarbonate, per mole of halophenol.

An excess (up to 20%) of carbonate or bicarbonate may be employed. Hence there may be 1 to 1.2 atoms of alkali metal per phenol group. While the use of an excess of carbonate or bicarbonate may give rise to faster reactions, there is the attendant risk of cleavage of the resulting polymer, particularly when using high temperatures and/or the more active carbonates.

The amount of the second (higher) alkali metal carbonate or bicarbonate employed is such that there are 0.001 to 0.2 gram atoms of the alkali metal of higher atomic number per gram atom of sodium.

Thus when using a mixture of carbonates, e.g. sodium carbonate and caesium carbonate, there should be 0.1 to 20 moles of caesium carbonate per 100 moles of sodium carbonate. Likewise when using a mixture of a bicarbonate and a carbonate, e.g. sodium bicarbonate and potassium carbonate, there should be 0.05 to 10 moles of potassium carbonate per 100 moles of sodium bicarbonate.

A mixed carbonate, for example sodium potassium carbonate, may be employed as the second alkali metal carbonate. In this case, where one of the alkali metal atoms of the mixed carbonate is sodium, the amount of sodium in the mixed carbonate should be added to that in the sodium carbonate when determining the amount of mixed carbonate to be employed.

The use of smaller amounts of the carbonate or bicarbonate of the higher atomic number alkali metal offers little or no advantage over using sodium carbonate or bicarbonate alone in terms of increased reaction rate or product properties. The use of greater amounts offers little further advantage in terms of increased reaction rate or product properties and increases the cost; there is also an enhanced risk of cleaving the resulting polymer to a lower molecular weight product.

We prefer to use from 0.005 to 0.1 gram atoms of the alkali metal of the second alkali metal carbonate or bicarbonate per gram atom of sodium.

Where a bisphenol and dihalobenzenoid compound are employed, they should be used in substantially equimolar amounts. An excess of one over the other leads to the production of low molecular weight products. However a slight excess, up to 5 mol %, of dihalide may be employed if desired.

The polymerisation temperature employed is in the range 100° to 400° C. and will depend on the nature of the reactants and the solvent, if any, employed. Thus when using very reactive condensates, such as 4,4'-difluorodiphenylsulphone in admixture with 4,4'-dihydroxydiphenyl sulphide, temperatures of the order of 100° to 140° C. may be used. For reactant combinations such as 4,4'-dichlorodiphenylsulphone and 2,2-bis(4-hydroxyphenyl)propane, temperatures of the order of 140° to 180° C. are suitable but for systems such as 4,4'-dihalodiphenylsulphone/4,4'-dihydroxydiphenylsulphone, and the ketone analogues, temperatures in excess of 250° C., preferably above 270° C., are generally desirable. For the production of some polymers, it may be desirable to commence polymerisation at one temperature, e.g. between 200° and 250° C. and to increase the temperature as polymerisation ensues. This is particularly necessary when making polymers having only a low solubility in the solvent. Thus, there it is desirable to increase the temperature progressively to maintain the polymer in solution as its molecular weight increases.

In the case of the reaction between hydroquinone and 4,4'-difluorobenzophenone, the reaction is advantageously carried out in the presence of an aromatic sulphone solvent, e.g. diphenylsulphone, at 150°–400° C. as this provides a polymer which has high molecular weight and is tough. Initially the temperature should be kept low to avoid loss of hydroquinone which is rather volatile and to minimise possible side reactions involving the hydroquinone. The temperature is raised in stages or continuously to a level such that the final polymer is in solution. The final temperature reached is preferably in the vicinity of 320° C.

When no solvent is employed in the process of the invention, the temperature should be sufficient to maintain the halophenol or bisphenol/dihalobenzenoid compound, and the polymer produced therefrom in the molten state.

To minimise cleavage reactions it is preferred that the maximum polymerisation temperature is below 350° C.

The polymerisation reaction may be terminated by mixing a suitable end stopping reagent, e.g. a mono or polyfunctional halide such as methyl chloride, t-butyl chloride or 4,4'-dichlorodiphenylsulphone with the reaction mixture at the polymerisation temperature.

In the reaction, alkali metal halides are produced as byproducts. These together with any polymerisation solvent employed can be removed from the reaction product by known methods employing techniques such as filtration and leaching.

Polymers prepared by the process of the present invention are particularly suitable for use in applications where the polymer is liable to be subject to high service temperatures. Examples of such applications include electrical insulation, e.g. wire coatings, electrical connector mouldings, and cookware coatings.

The invention is illustrated by the following Examples.

EXAMPLE 1

4,4'-dihydroxydiphenylsulphone (25.028 g, 0.1000 M), 4,4'-dichlorodiphenylsulphone (28.861 g, 0.1005 M), diphenyl sulphone (69.6 g), anhydrous analytical grade sodium carbonate (11.12 g, 0.105 M), were charged to a 3-necked flask of capacity 250 ml fitted with nitrogen purge, stirrer and air condenser.

The flask was heated on a metal bath at 300° C. for 2 hours and then the temperature raised to 320° C. and maintained for 21½ hours. Methyl chloride was then bubbled through for 30 minutes in order to terminate polymerisation.

The reaction mixture was then cooled and the alkali metal salts and diphenylsulphone extracted using methanol, then water and then an acetone/methanol (1:9 weight ratio) mixture.

The resultant polymer had a reduced viscosity (as measured at 25° C. on a solution of the polymer in dimethyl formamide, the solution containing 1 g of polymer per 100 cm$^3$ of solution—this method was used in Examples 1 to 16) of 0.49.

To monitor the course of the polymerisation reaction samples were taken of the reaction mixture and the reduced viscosity (RV) of these samples was determined. From previously established correlations, the true RV of the polymer at any stage of the polymerisation is given by the equation:

true RV=(RV of reaction mixture)−0.04

The results are shown in Table 1 below.

EXAMPLES 2 AND 3

Example 1 was repeated but charging in addition anhydrous analytical grade potassium carbonate (0.346 g, 0.0025 M in Example 2 and 1.38 g, 0.01 M in Example 3).

The results are shown in Table 1. The mixture was maintained at 320° C. for 20½ hours in Example 2 and 21 hours in Example 3.

EXAMPLE 4

Example 1 was repeated but replacing the sodium carbonate by anhydrous analytical grade potassium carbonate (14.51 g, 0.105 M).

EXAMPLES 5 to 7

Example 1 was repeated with the addition of varying amounts of caesium carbonate and varying polymerisation times at 320° C.

| Example | Amount of caesium carbonate | | Time at 320° C. hours |
|---|---|---|---|
| | g | molar | |
| 5 | 0.356 | 0.00107 | 27½ |
| 6 | 1.77 | 0.0053 | 21½ |
| 7 | 3.26 | 0.01 | 21 |

The results are shown in Table 1.

EXAMPLE 8

Example 1 was repeated but replacing the sodium carbonate by ground, dried caesium carbonate (34.21 g, 0.105 M) and using a polymerization temperature of 285° C. instead of 300°/320° C. The reaction was end stopped after 4½ hours by adding 4,4'-dichlorodiphenylsulphone (0.3 g) in addition to methyl chloride. The results are shown in Table 1.

cleavage of the polymer occurs giving finally only a relatively low molecular weight polymer. Cleavage also occurred when using a relatively large ratio of caesium to sodium (Example 7) but to a lesser extent than when using potassium or caesium carbonates alone (Examples 4 and 8).

EXAMPLE 9

Example 1 was repeated using analytical grade sodium bicarbonate (16.97 g, 0.202 M) in place of the sodium carbonate and using a polymerisation temperature of 285° C. for 24 hours.

The results are shown in Table 2.

EXAMPLE 10

Example 8 was repeated but using a greater excess of sodium bicarbonate (18.65 g, 0.222 M).

Polymerisation was commenced at 230° C. until foaming subsided whereupon the temperature was increased to 285° C. and maintained at that temperature for 7 hours. The temperature was then reduced to 268° C. and maintained for 64 hours before end stopping.

The results are shown in Table 2.

EXAMPLES 11 TO 16

Example 10 was repeated using varying amounts of sodium bicarbonate with the addition of various amounts of potassium carbonate. The reaction was terminated after the period at 285° C.

| | NaHCO₃ | | K₂CO₃ | | Polymerisation time at 285° C. before end stopping (hours) |
|---|---|---|---|---|---|
| Example | (g) | (moles) | (g) | (moles) | |
| 11 | 16.97 | 0.202 | 1.40 | 0.01 | 6½ |
| 12 | 16.97 | 0.202 | 0.35 | 0.0025 | 7 |
| 13 | 16.95 | 0.2018 | 0.2018 | 0.0001 | 6 |
| 14 | 16.93 | 0.2015 | 0.035 | 0.00025 | 6½ |
| 15 | 16.80 | 0.2 | 0.138 | 0.001 | 6 |
| 16 | 16.55 | 0.197 | 0.35 | 0.0025 | 7 |

TABLE 1

| Example | | moles Na₂CO₃ | moles K₂CO₃ or Cs₂CO₃ | K/Na or Cs/Na ratio | Total alkali metal phenol groups | RV of polymer at various times (X hr) from start of polymerisation | | | | | | RV Final (after end stopping) |
|---|---|---|---|---|---|---|---|---|---|---|---|---|
| | | | | | | X = 1 | 2 | 3 | 6 | 21 | 22 | |
| 1 | Na₂CO₃ | 0.105 | 0 | 0 | 1.05 | 0.11 | 0.16 | 0.26 | 0.39 | 0.47 | — | 0.49 |
| 2 | Na₂CO₃ | 0.105 | 0.0025 | 0.024 | 1.075 | 0.09 | 0.17 | 0.33 | 0.48 | — | 0.53 | 0.53 |
| 3 | + K₂CO₃ | 0.105 | 0.01 | 0.095 | 1.15 | 0.14 | 0.29 | 0.47 | 0.72 | — | 0.90 | 0.82 |
| 4 | K₂CO₃ | 0 | 0.105 | — | 1.05 | 0.54 | 0.80 | 0.74 | 0.34 | 0.20 | — | 0.21 |
| 5 | Na₂CO₃ | 0.105 | 0.00107 | 0.010 | 1.06 | 0.06 | 0.15 | 0.30 | 0.49 | — | 0.53 | 0.49 |
| 6 | + | 0.105 | 0.0053 | 0.050 | 1.10 | 0.18 | 0.30 | 0.47 | 0.54 | — | 0.58 | 0.54 |
| 7 | Cs₂CO₃ | 0.105 | 0.01 | 0.095 | 1.15 | 0.16 | 0.47 | 0.72 | 0.96 | 0.29* | — | 0.27 |
| 8 | Cs₂CO₃ | 0 | 0.105 | — | 1.05 | 0.45 | 0.32 | 0.26** | — | — | — | 0.27 |

*after 20 hours
**after 4½ hours at 285° C.

It is seen from the results in Table 1 that the addition of a very small amount of potassium or caesium carbonate (Examples 2, 3, 5, 6, 7) gives a much faster rate of reaction compared with sodium carbonate alone (Example 1). The use of potassium or caesium carbonate (Examples 4 and 8) alone gives a faster reaction but The results are shown in Table 2.

Examples 9 to 16 illustrate that addition of even relatively very small amounts of an alkali metal of higher atomic number gives a greatly increased reaction rate.

TABLE 2

| Example | moles NaHCO$_3$ | moles K$_2$CO$_3$ | K/Na ratio | Total alkali metal phenol groups | RV of polymer at various times (X hr) from reaching 285° C. X = 2 | 4 | 6.5 | 7 | 24 | 71 | RV Final (after end stopping) |
|---|---|---|---|---|---|---|---|---|---|---|---|
| 9 } NaHCO$_3$ | 0.202 | 0 | 0 | 1.01 | 0.05 | 0.24 | — | 0.33* | 0.41 | — | 0.41 |
| 10 | 0.222 | 0 | 0 | 1.11 | 0.09 | 0.24 | — | 0.31 | — | 0.41** | 0.40 |
| 11 | 0.202 | 0.01 | 0.099 | 1.11 | 0.42 | 0.51 | 0.56 | — | — | — | 0.53 |
| 12 | 0.202 | 0.0025 | 0.025 | 1.035 | 0.21 | 0.45 | — | 0.50 | — | — | 0.49 |
| 13 NaHCO$_3$ + K$_2$CO$_3$ | 0.2018 | 0.0001 | 0.001 | 1.01 | 0.10 | 0.30 | 0.48*** | — | — | — | 0.46 |
| 14 | 0.2015 | 0.00025 | 0.0025 | 1.01 | 0.16 | 0.38 | 0.50 | — | — | — | 0.51 |
| 15 | 0.2 | 0.001 | 0.01 | 1.01 | 0.16 | 0.41 | 0.50 | — | — | — | 0.54 |
| 16 | 0.197 | 0.0025 | 0.025 | 1.01 | 0.30 | 0.48 | — | 0.63 | — | — | 0.63 |

*after 7.5 hours
**after 7 hours at 285° C. then 64 hours at 268° C.
***after 6 hours

EXAMPLE 17

4,4'-difluorobenzophenone (21.82 g, 0.10 M); hydroquinone (11.01 g, 0.10 M); and diphenylsulphone (60 g) were charged to a 3-necked glass flask equipped with a stirrer, nitrogen inlet and air condenser. These materials were heated with stirring to 180° C. to form a nearly colourless solution, and while maintaining a nitrogen blanket anhydrous sodium carbonate (10.7 g, 0.10 M) was added. The temperature was raised to 200° C. and maintained there for 1 hour. The temperature was then raised to 250° C. and maintained there for 15 minutes and then finally raised to 320° C. and maintained there for 2.5 hours.

The reaction mixture, which had become rather dark, was cooled and the resulting solid product milled so as to pass through a 500 μm sieve. Diphenylsulphone and inorganic salts were removed by washing successively with acetone (twice), water (thrice), and acetone/methanol (twice).

The resulting solid polymer was dried at 140° C. under vacuum. The polymer which consisted of the repeat unit

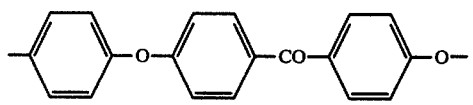

had a reduced viscosity (RV) of 0.60 [RV measured at 25° C. on a solution of the polymer in concentrated sulphuric acid of density 1.84 g. cm$^{-3}$, said solution containing 1 g of polymer per 100 cm$^3$ of solution—this method was used in Examples 17 to 19].

A film, compression moulded from the polymer at 400° C. and cooled slowly (being taken out of the oven at 120° C. after 30 minutes cooling) was brittle (the film snapped when hinged through 180°) and dark grey in colour.

EXAMPLE 18

Polymer was prepared in a manner similar to that of Example 17 except that the polycondensation was carried out on a larger scale and in a stainless steel vessel and using potassium carbonate instead of sodium carbonate, the quantities of materials used being as follows: 4,4'-difluorobenzophenone (4364 g, 20.0 M), hydroquinone (2202 g, 20.0 M), diphenylsulphone (12000 g) and anhydrous potassium carbonate (2792 g, 20.2 M) (added later as in the technique of Example 17).

The resulting polymer in this case had an RV of 1.55 and yielded films (compression moulded as in Example 17) which were tough in that they could be hinged through 180° and then several times through 360° without breaking, and which were lighter in colour than those made from polymer using sodium carbonate alone. However, the polymer contained a quantity of gel (i.e. material which became swollen by but did not dissolve in sulphuric acid) and the reaction vessel had acquired a black coating.

EXAMPLE 19

Polymer was prepared in a manner similar to that of Example 18 except that a mixture of anhydrous sodium carbonate (2056 g, 19.4 M) and anhydrous potassium carbonate (138 g, 1.0 M) was used in place of the anhydrous potassium carbonate (2792 g, 20.2 M) used in Example 18.

The resulting polymer had an RV of 1.55 and gave tough (as defined in Example 18) off-white film. In this case there was no gel present in the polymer and the reaction vessel had not become discoloured.

We claim:

1. A process for the production of an aromatic polyether containing —SO$_2$— and/or —CO— linkages comprising heating in the temperature range 100° to 400° C. (i) a substantially equimolar mixture of (a) at least one bisphenol and (b) at least one dihalobenzenoid compound, or (ii) at least on halophenols, in which dihalobenzenoid compound or halophenol the halogen atoms are activated by —SO$_2$— or —CO— groups ortho or para thereto, with a mixture of sodium carbonate or bicarbonate and a second alkali metal carbonate or bicarbonate, the alkali metal of said second alkali metal carbonate or bicarbonate having a higher aromatic number than that of sodium, the amount of the second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from alkali metal halide.

2. A process according to claim 1 wherein the amount of said second alkali metal carbonate or bicarbonate is such that there are 0.005 to 0.1 gram atoms of said alkali metal of higher atomic weight per gram atom of sodium.

3. A process according to claim 1 wherein the second alkali metal is potassium or caesium.

4. A process according to claim 1 wherein sodium carbonate or bicarbonate is used in conjunction with potassium carbonate.

5. A process according to claim 1 wherein the amount of alkali metal carbonate or bicarbonate is such that there are 1 to 1.2 atoms of alkali metal per phenol group.

6. A process according to claim 1 wherein said heating is carried out in the presence of a solvent which is an aromatic sulphone of the formula

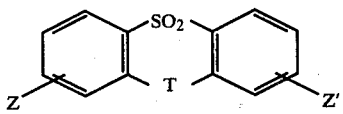

where T is a direct link, an oxygen atom or two hydrogen atoms (one attached to each benzene ring) and Z and Z', which may be the same or different, are hydrogen atoms or phenyl groups.

7. A process according to claim 6 wherein the solvent is diphenylsulphone.

8. A process according to claim 1 wherein in (i) the at least one bisphenol has the formula

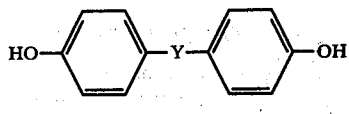

in which Y is a direct link, oxygen, sulphur, —SO$_2$—, —CO—, or a divalent hydrocarbon radical.

9. A process according to claim 8 wherein the bisphenol is selected from 4,4'-dihydroxydiphenylsulphone, 4,4'-dihydroxybenzophenone, 2,2'-bis-(4-hydroxyphenyl) propane, 4,4'-dihydroxybiphenyl and 4,4'-dihydroxydiphenyl sulphide.

10. A process according to claim 1 wherein in (i) the at least one dihalobenzoid compound has the formula

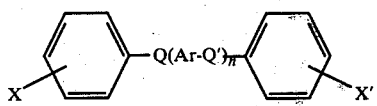

in which X and X', which may be the same or different, are halogen atoms and are ortho or para to the groups Q and Q', Q and Q', which may be the same or different, are —CO— or —SO$_2$—; Ar is a divalent aromatic radical; and n is 0, 1, 2 or 3.

11. A process according to claim 10 wherein the dihalobenzenoid compound is selected from one or more of 4,4'-dichlorodiphenylsulphone, 4,4'-difluorodiphenylsulphone, 4,4'-dichlorobenzophenone and bis-4,4'-(4-chlorophenylsulphonyl)biphenyl.

12. A process according to claim 1 wherein the at least one halophenol in (ii) has the formula

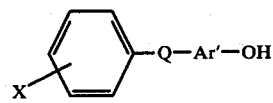

where X is a halogen atom and is ortho or para to Q; Q is —SO$_2$— or —CO—; Ar' is an aromatic radical; and —OH is para to the group Q.

13. A process according to claim 12 wherein the halophenol is selected from one or more of 4-(4-chlorophenylsulphonyl)phenol, 4-(4-fluorophenylsulphonyl)phenol, 4-(4-chlorobenzoyl)phenol, 4-hydroxy-4'-(4-chlorophenylsulphonyl)biphenyl and 4-(4-hydroxyphenylsulphonyl)-4'-(4-chlorophenylsulphonyl)biphenyl.

* * * * *